United States Patent
Hattori et al.

(10) Patent No.: US 8,519,624 B2
(45) Date of Patent: Aug. 27, 2013

(54) ROADSIDE-VEHICLE COOPERATIVE ILLUMINATION SYSTEM

(75) Inventors: Yousuke Hattori, Aichi-ken (JP);
Katsuyuki Mori, Ichinomiya (JP);
Kunihiko Chiba, Kuwana (JP);
Masahiro Goto, Nagoya (JP)

(73) Assignee: DENSO CORPORATION, Kariya (JP)

( * ) Notice: Subject to any disclaimer, the term of this patent is extended or adjusted under 35 U.S.C. 154(b) by 166 days.

(21) Appl. No.: 13/239,735

(22) Filed: Sep. 22, 2011

(65) Prior Publication Data

US 2012/0074842 A1     Mar. 29, 2012

(30) Foreign Application Priority Data

Sep. 29, 2010   (JP) .................................. 2010-219389

(51) Int. Cl.
*B60Q 1/14*   (2006.01)
(52) U.S. Cl.
USPC .............................. 315/77; 315/82; 315/157
(58) Field of Classification Search
USPC ........ 315/76, 77, 80, 82, 149–159; 307/10.1, 307/10.8; 340/933
See application file for complete search history.

(56) References Cited

U.S. PATENT DOCUMENTS

| 6,906,467 | B2 * | 6/2005 | Stam et al. ...................... 315/82 |
| 7,157,856 | B2 * | 1/2007 | Chon et al. ...................... 315/82 |
| 7,649,442 | B2 * | 1/2010 | Kobayashi et al. ......... 340/425.5 |
| 2004/0257245 | A1 * | 12/2004 | Jo ................................. 340/936 |

FOREIGN PATENT DOCUMENTS

| JP | A-04-342986 | 11/1992 |
| JP | A-05-013174 | 1/1993 |
| JP | A-05-283173 | 10/1993 |
| JP | A-H07-031005 | 1/1995 |
| JP | A-2001-102182 | 4/2001 |
| JP | A-2001-307895 | 11/2001 |
| JP | A-2002-305088 | 10/2002 |
| JP | A-2004-168209 | 6/2004 |
| JP | A-2004-291816 | 10/2004 |
| JP | A-2005-100765 | 4/2005 |
| JP | A-2010-202094 | 9/2010 |

* cited by examiner

*Primary Examiner* — Tung X Le
(74) *Attorney, Agent, or Firm* — Posz Law Group, PLC

(57) ABSTRACT

A roadside-vehicle cooperative illumination system in which a headlight of a vehicle and a road illumination lamp can be controlled cooperatively through communications between an in-vehicle apparatus and a roadside apparatus. For example, when power consumption of the headlight has to be reduced, an in-vehicle apparatus side arbiter transmits a request to the roadside apparatus for increase illumination of the road illumination lamp. A roadside apparatus side arbiter determines whether or not to accept the request from the in-vehicle apparatus, and a roadside apparatus side controller controls the road illumination lamp according to the determination of the roadside apparatus side arbiter. This enables the road illumination lamp to be controlled cooperatively so that illumination of the road illumination lamp can compensate for deficiencies in illumination of the headlight, which leads to enhancement of vehicle driver's convenience and ensuring of safety.

9 Claims, 4 Drawing Sheets

ROADSIDE-VEHICLE COOPERATIVE ILLUMINATION SYSTEM

CROSS-REFERENCE TO RELATED APPLICATION

This application is based on and claims the benefit of priority from earlier Japanese Patent Application No. 2010-219389 filed Sep. 29, 2010, the description of which is incorporated herein by reference.

BACKGROUND

1. Technical Field

This invention relates to a roadside-vehicle cooperative illumination system in which a headlight of a vehicle and a road illumination lamp are controlled cooperatively through communications between an in-vehicle apparatus and a roadside apparatus.

2. Related Art

A known road illumination system, as disclosed in Japanese Patent Application Publication No. 2002-305088, controls illumination of a road illuminator as a function of a traffic density so as to reduce power consumption of the road illuminator.

The above disclosed road illumination system includes a road illuminator that illuminates a road, a service marker arranged at a position through which a vehicle that will travel within a region to be illuminated on the road can pass, and a radio tag that receives a radio signal sent from the vehicle when the vehicle has passed through the service marker. The road illuminator is controlled by its controller to reduce or extinguish illumination of its road illumination lamp until the signal from the vehicle is received by the radio tag. Upon reception of the signal from the vehicle, the road illuminator is controlled to illuminate the road illumination lamp with sufficient brightness for a prescribed period of time.

The above disclosed road illumination system is also operative to, upon detection of an obstacle on the road such as a pedestrian, a bicycle, and a vehicle, control the road illumination lamp so as to spotlight the obstacle, or upon occurrence of an accident such as a traffic accident and a disaster, change illumination color of the road illumination lamp or blink the lamp on and off at and around the scene of the accident.

In operation, the above disclosed road illumination system turns on the road illumination lamp of the road illuminator in the presence of a passing vehicle, and dims or turns off the road illumination lamp of the road illuminator in the absence of the passing vehicle, thereby reducing power consumption of the road illuminator. In other words, the above disclosed road illumination system turns on the road illumination lamp only in the presence of the passing vehicle without taking into account a state or condition of the passing vehicle.

For example, in the case of a motor-driven vehicle with a reduced SOC (state of charge) of a vehicle battery that supplies electrical power to the vehicle, lighting of a headlight of the vehicle will consume electrical power of the battery, which may lead to reduction in continuously travelable distance. In such a case, increasing an illuminance and/or an illumination range of the road illumination lamp of the road illuminator to an extent large enough to reliably confirm the safety in a forward direction of the vehicle will allow the illuminance of the headlight of the motor-driven vehicle to be lowered and the power consumption of the lighting headlight to be suppressed. This may minimize reduction in continuously travelable distance and enhance motor-driven vehicle driver's convenience. In addition, to ensure the safety in a forward direction of the vehicle in the absence of sufficient brightness in the forward direction due to a headlight failure, it may be efficient to increase the illuminance of the road illuminator.

That is, when power consumption of the headlight of the vehicle has to be reduced or when it is not possible to ensure a sufficient illuminance of the headlight, the road illumination lamp may be controlled cooperatively with the headlight through the communications between the in-vehicle apparatus and the road illuminator so that illumination of the road illumination lamp can compensate for deficiencies in illumination of the headlight, which will lead to enhancement of the driver's convenience and ensuring of safety.

In consideration of the foregoing, exemplary embodiments of the present invention are directed to providing a roadside-vehicle cooperative illumination system, in which a headlight of a vehicle and a road illumination lamp can be controlled cooperatively through communications between an in-vehicle apparatus and a roadside apparatus.

SUMMARY

In accordance with an exemplary aspect of the present invention, there is provided a roadside-vehicle cooperative illumination system including an in-vehicle apparatus mounted in a vehicle and responsible for controlling a headlight of the vehicle and a roadside apparatus positioned along a roadside and responsible for controlling a road illumination lamp, in which the headlight and the road illumination lamp are controlled cooperatively through communications between the in-vehicle apparatus and the roadside apparatus. The in-vehicle apparatus includes: a communication unit that communicates with the roadside apparatus; a detector that detects information pertaining to operation of the headlight of the vehicle; and an arbiter that transmits a request to the roadside apparatus for altering at least one of an illuminance and an illumination range of the road illumination lamp on the basis of the information pertaining to operation of the headlight of the vehicle detected by the detector. The roadside apparatus includes: a communication unit that communicates with the in-vehicle apparatus; an arbiter that determines whether or not to accept the request from the in-vehicle apparatus side arbiter, and determines at least one of the illuminance and the illumination range of the road illumination lamp on the basis of the determination of whether or not to accept the request from the in-vehicle apparatus side arbiter; and a controller that controls the road illumination lamp according to the at least one of the illuminance and the illumination range of the road illumination lamp determined by the roadside apparatus side arbiter.

With this configuration, the in-vehicle apparatus side detector detects information pertaining to operation of the headlight, such as when power consumption of the headlight has to be reduced and when it is not possible to ensure a sufficient illuminance of the headlight. The in-vehicle apparatus side arbiter transmits a request to the roadside apparatus for increasing at least one of an illuminance and an illumination range of the road illumination lamp on the basis of the detected information. In case the roadside apparatus side arbiter accepts the request, the roadside apparatus side controller controls the road illumination lamp to increase at least one of an illuminance and an illumination range of the road illumination lamp. This enables the road illumination lamp to be controlled cooperatively with the headlight so as to compensate for deficiencies in illuminance and/or illumination range of the headlight, which leads to enhancement of vehicle driver's convenience and ensuring of safety.

DESCRIPTION OF SPECIFIC EMBODIMENTS

The present invention will be described more fully hereinafter with reference to the accompanying drawings. Like numbers refer to like elements throughout.

Figure 1:
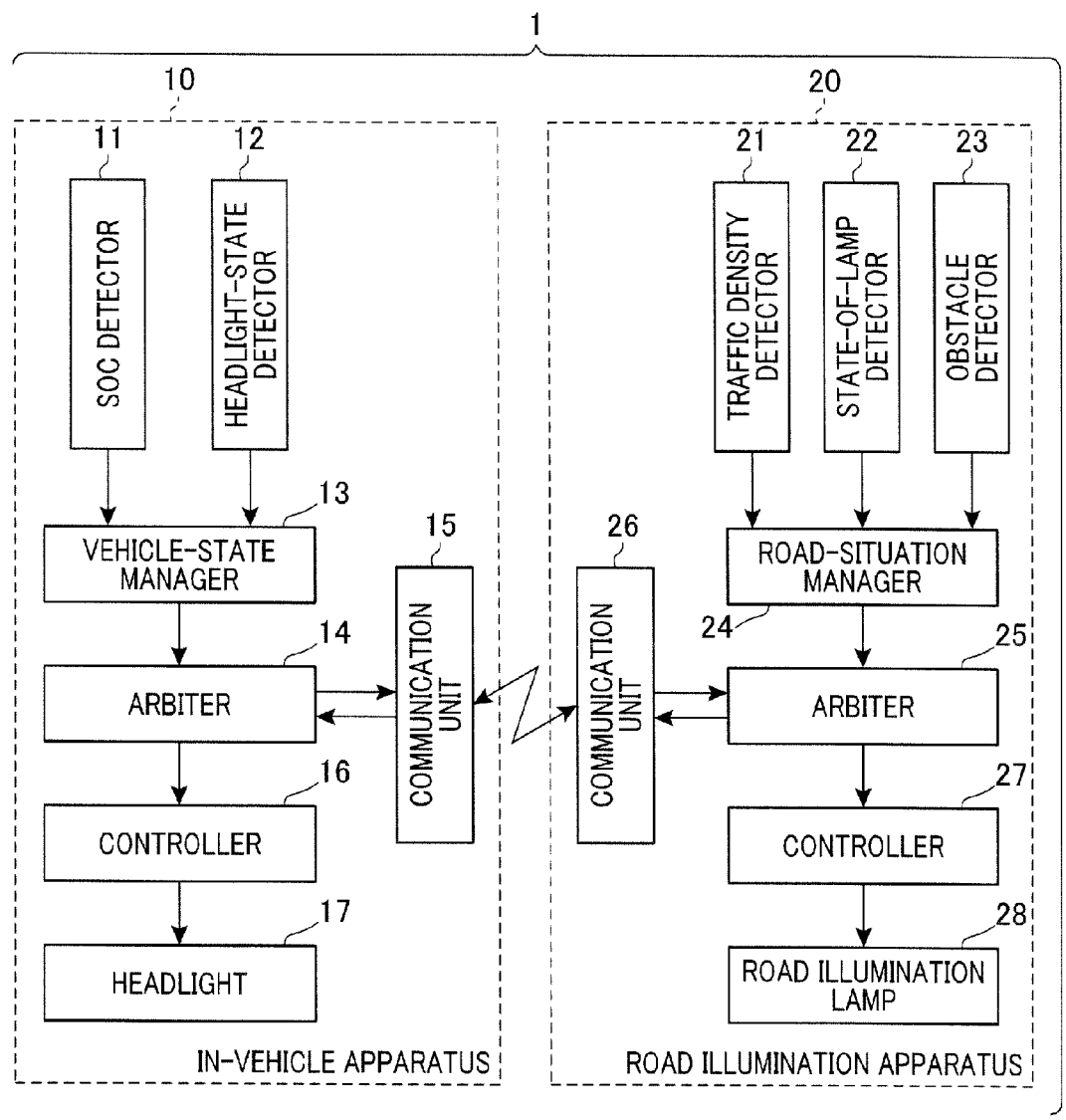
FIG. 1 shows a block diagram of a roadside-vehicle cooperative illumination system in accordance with one embodiment of the present invention.

FIG. 1 shows a block diagram of a roadside-vehicle cooperative illumination system in accordance with one embodiment of the present invention. It is assumed in the present embodiment that a motor-driven vehicle is passing through an illumination range of a road illumination apparatus (or a road illuminator) 20 which is a roadside apparatus. In alternative embodiments, the motor-driven vehicle may be replaced with an engine-driven vehicle.

Referring to FIG. 1, the roadside-vehicle cooperative illumination system 1 includes an in-vehicle apparatus 10 mounted in the motor-driven vehicle, and a road illumination apparatus 20.

The motor-driven vehicle includes a motor (not shown) that drives the vehicle and a battery (not shown) that supplies electrical power to the headlight 17. The in-vehicle apparatus 10 of the motor-driven vehicle includes a state-of-charge (SOC) detector 11 that detects a SOC or remaining battery level of the battery. The in-vehicle apparatus 10 further includes a headlight-state detector 12 that detects an operating state of the headlight 17 of the motor-driven vehicle. Detections of the SOC detector 11 and the headlight-state detector 12, which are information pertaining to operation of the headlight 17, are outputted to a vehicle-state manager 13.

The vehicle-state manager 13 determines whether or not the SOC of the battery detected by the SOC detector 11 is decreased equal to or smaller than a predetermined value. The determination is inputted in an in-vehicle apparatus side arbiter 14 which will be described later. Optionally, the vehicle-state manager 13 may estimate a continuously travelable distance on the basis of the detected SOC of the battery, and display the estimated distance on an indicator (not shown).

In addition, the vehicle-state manager 13 determines whether the headlight 17 is operating normally or malfunctioning due to a failure on the basis of the detection of the headlight-state detector 12. The determination is also inputted in the in-vehicle apparatus side arbiter 14 which will be described later.

When the in-vehicle apparatus side arbiter 14 receives from the vehicle-state manager 13 a determination that the SOC of the battery is decreased equal to or smaller than the predetermined value, or a determination that the headlight 17 is malfunctioning due to a failure during the headlight 17 being lighting, the in-vehicle apparatus side arbiter 14 transmits to the road illumination apparatus 20 a request for increasing at least one of an illuminance and an illumination range. This makes it possible to request the road illumination apparatus 20 to increase the illuminance and/or the illumination range when the power consumption of the headlight 17 has to be reduced by decreasing the illuminance and/or the illumination range of the headlight 17 or when it is not possible to ensure a sufficient illuminance of the headlight 17. The above request from the in-vehicle apparatus side arbiter 14 to the road illumination apparatus 20 is to be transmitted via an in-vehicle apparatus side communication unit 15.

The in-vehicle apparatus side arbiter 14 receives a response to the transmitted request from the road illumination apparatus 20 via the in-vehicle apparatus side communication unit 15. On the other hand, upon reception of the request from the in-vehicle apparatus 10 for increasing at least one of the illuminance and the illumination range, the road illumination apparatus 20 generally accepts the received request unless the request cannot be accepted for a particular reason such as a failure.

Upon reception of the response from the road illumination apparatus 20 that is indicative of acceptance of the request, the in-vehicle apparatus side arbiter 14 determines to decrease the illuminance of the headlight 17 when the remaining battery level (or SOC) is decreased equal to or smaller than the predetermined value. That is, it becomes possible for the road illumination lamp 28 to compensate for deficiencies in illumination of the headlight 17, which allows the in-vehicle apparatus 10 of the motor-driven vehicle to reduce the illuminance and/or the illumination range of the of the headlight 17. This leads to reduction in power consumption of the headlight 17, and thus to minimum reduction of the continuously travelable distance.

On the other hand, upon reception of the response from the road illumination apparatus 20 that is indicative of refusal of the request, the in-vehicle apparatus side arbiter 14 determines to maintain the normal illuminance and illumination range of the of the headlight 17 without reducing the illuminance and/or illumination range of the headlight 17.

As will be described later, the in-vehicle apparatus side arbiter 14 may receive a request for altering at least one of the illuminance and the illumination range of the headlight 17 from the roadside apparatus side arbiter 25 of the road illumination apparatus 20. Upon reception of such a request, the in-vehicle apparatus side arbiter 14 determines whether or not to accept the request on the basis of the determinations of the vehicle-state manager 13. That is, the in-vehicle apparatus side arbiter 14 determines the illuminance and/or the illumination range of the headlight 17 on the basis of the request from the roadside apparatus side arbiter 25 and a required or allowable illumination range for the own convenience, thereby performing arbitration for an illumination mode of the headlight 17.

The in-vehicle apparatus side arbiter 14 outputs the determined illuminance and/or illumination range to the in-vehicle apparatus side controller 16. The in-vehicle apparatus side controller 16 controls the headlight 17 according to the illuminance and/or illumination range determined by the in-vehicle apparatus side arbiter 14.

The illuminance and/or the illumination range of the headlight 17 can be variably set in a continuous or stepwise manner. Only either one of the illuminance and the illumination range of the headlight 17 may be variably set, or both of the illuminance and the illumination range of the headlight 17 may be variably set simultaneously. To reduce the power consumption of the battery, it is necessary to reduce at least the illuminance of the headlight 17. Indeed, reducing the illuminance as well as the illumination range of the headlight 17 may lead to reduction in visible range for the driver of the motor-driven vehicle. However, this can prevent much reduction in brightness over the illumination range.

There will now be explained operation of the road illumination apparatus 20. The road illumination apparatus 20 includes a traffic density detector 21 that detects a traffic density of the road to be illuminated by the road illumination lamp 28. For example, the traffic density detector 21 can detect the traffic density by counting running vehicles on the road that are recognizable from road images photographed by a camera or by acquiring information on the traffic density of the road that is available from a traffic information center (not shown). The road illumination apparatus 20 further includes a state-of-lamp detector 22 that detects an operating state of the road illumination lamp 28, and an obstacle detector 23 that detects an obstacle on the road such as a disabled vehicle.

Detections of the traffic density detector 21, the state-of-lamp detector 22, and the obstacle detector 23 are outputted to the road-situation manager 24. The road-situation manager 24 determines, on the basis of the detection of the traffic density detector 21, whether or not the traffic density is equal to or larger than a predetermined value, and/or whether or not oncoming vehicles go by each other around an illumination spot of the road illumination lamp 28. The road-situation manager 24 determines, on the basis of the detection of the state-of-lamp detector 22, whether the road illumination lamp 28 is operating normally or malfunctioning due to a failure. In cases where the road illumination lamp 28 is operating normally, the road illumination lamp 28 can normally illuminate the road. On the other hand, in cases where the road illumination lamp 28 is malfunctioning, the road illumination lamp 28 is unable to illuminate the road, or it is not possible to alter the illuminance and the illumination range of the road illumination lamp 28. In addition, the road-situation manager 24 determines, on the basis of the detection of the obstacle detector 23, whether or not there exists an obstacle on the road, and locates the obstacle if any. Determinations of the road-situation manager 24 are outputted to the roadside apparatus side arbiter 25.

Upon reception of the request from the in-vehicle apparatus 10 for increasing at least one of the illuminance and the illumination range, the roadside apparatus side arbiter 25 determines whether or not to accept the request, for example, on the basis of the determination of the road-situation manager 24 that is made on the basis of the detection of the state-of-lamp detector 22. That is, the roadside apparatus side arbiter 25 performs arbitration between the request from the in-vehicle apparatus 10 and at least one of a required illumination range and an allowable illumination range for one's own convenience to determine an illumination mode of the road illumination apparatus 20.

In the presence of an obstacle on the road detected by the obstacle detector 23, spotlighting the obstacle can facilitate driver's finding of the obstacle. For this purpose, the roadside apparatus side arbiter 25 may give preference to spotlighting the obstacle over the request from the in-vehicle apparatus 10. Also in the presence of a disaster such as a traffic accident, the roadside apparatus side arbiter 25 may give preference to spotlighting the accident occurrence site over the request from the in-vehicle apparatus 10.

After the above arbitration for the illumination mode of the road illumination apparatus 20, the roadside apparatus side arbiter 25 transmits to the in-vehicle apparatus 10 a response indicative of whether or not the request from the in-vehicle apparatus 10 is acceptable.

Without reception of the request from the in-vehicle apparatus 10 for increasing at least one of the illuminance and the illumination range of the road illumination lamp 28, the roadside apparatus side arbiter 25 determines, on the basis of various determinations as described above of the road-situation manager 24, whether to turn on or off the road illumination lamp 28, and in the case of determining to turn on the road illumination lamp 28, determines an illumination mode of the road illumination lamp 28. For example, in cases where the traffic density detected by the traffic density detector 21 is equal to or larger than the predetermined value, the roadside apparatus side arbiter 25 determines to decrease at least one of the illuminance and the illumination range of the road illumination lamp 28, or to turn off the road illumination lamp 28. This is because, under such a high traffic density condition that there are many vehicles passing through the illumination range of the road illumination lamp 28, it is possible to ensure sufficient brightness only from lighting headlights of the passing vehicles.

In addition, the roadside apparatus side arbiter 25 transmits to the in-vehicle apparatus 10 a request for altering (or changing) at least one of the illuminance and the illumination range of the headlight 17 according to various situations. To ensure the safety, for example, in the presence of a failure in the road illumination lamp 28 where it is not possible to ensure a sufficient illuminance of the road illumination lamp 28, it is desirable to increase at least one of the illuminance and the illumination range of the headlight 17. On the other hand, in the presence of dwellings facing a road where the headlight 17 of the vehicle running on the road will probably dazzle the dwellers, it is desirable to reduce at least one of the illuminance and the illumination range of the headlight 17 while ensuring a sufficient illuminance of the road illumination lamp 28. In this way, the request from the roadside apparatus side arbiter 25 to the in-vehicle apparatus 10 for altering at least one of the illuminance and the illumination range of the headlight 17 according to various situations enables the headlight 17 of the vehicle and the road illumination lamp 28 on the roadside to be controlled to cooperatively illuminate the road.

There will now be explained an exemplary scenario where the roadside apparatus side arbiter 25 transmits to the in-vehicle apparatus 10 a request for altering at least one of the illuminance and the illumination range of the headlight 17.

For example, when a request for increasing at least one of the illuminance and the illumination range of the road illumination lamp 28 is transmitted from the in-vehicle apparatus 10 of at least one of a plurality of vehicles passing through the illumination range of the road illumination lamp 28 around the same time, and the roadside apparatus side arbiter 25 accepts the request, the roadside apparatus side arbiter 25 transmits to an in-vehicle apparatus 10 of each of the other vehicles a request for decreasing at least one of the illuminance and the illumination range of the headlight 17 of the other vehicle. Even in the presence of only one vehicle among the plurality of vehicles that transmits a request for increasing at least one of illuminance and the illumination range of the road illumination lamp 28, increasing of at least one of the illuminance and the illumination range of the road illumination lamp 28 in response to the request leads to ensuring of safety and enhancement of the convenience. In such a case, each of the other vehicles decreasing at least one of the illuminance and the illumination range of the corresponding headlight 17 will not cause any safety problem, which allows the roadside apparatus side arbiter 25 to request each of the other vehicles to decrease at least one of the illuminance and the illumination range of the headlight 17 of the other vehicle.

Further, upon occurrence of a failure in the road illumination lamp 28, the roadside apparatus side arbiter 25 requests the in-vehicle apparatus 10 to increase one of the illuminance and the illumination range of the headlight 17 of the vehicle. This enables the headlight 17 of the vehicle to be controlled so as to compensate for deficiencies in illumination of the road illumination lamp 28 when it is not possible to ensure a sufficient illuminance of the road illumination lamp 28 due to occurrence of a failure in the road illumination lamp 28.

Still further, when a plurality of oncoming vehicles go by each other around an illumination spot of the road illumination lamp 28, the roadside apparatus side arbiter 25 may request the in-vehicle apparatus 10 of each oncoming vehicle to decrease at least one of the illuminance and the illumination range of the headlight of the oncoming vehicle, and may increase at least one of the illuminance and the illumination range of the road illumination lamp 28. This enables the headlight 17 of each oncoming vehicle and the road illumination lamp 28 to be controlled cooperatively so as to prevent the headlight of each oncoming vehicle from dazzling the drivers of the other oncoming vehicles.

The illuminance and the illumination range of the road illumination lamp 28 determined by the roadside apparatus side arbiter 25 are outputted to the roadside apparatus side controller 27. The roadside apparatus side controller 27 controls the road illumination lamp 28 according to the illuminance and the illumination range determined by the roadside apparatus side arbiter 25.

The road illumination lamp 28, which is positioned along a roadside to illuminate the road, is configured to variably set the illuminance and the illumination range in a continuous or stepwise manner. In addition, one or more road illumination lamps 28 may be controlled by the roadside apparatus side controller 27.

There will now be explained operation of the roadside-vehicle cooperative illumination system in accordance with the present embodiment with reference to FIG. 2 and FIG. 3.

Figure 2:
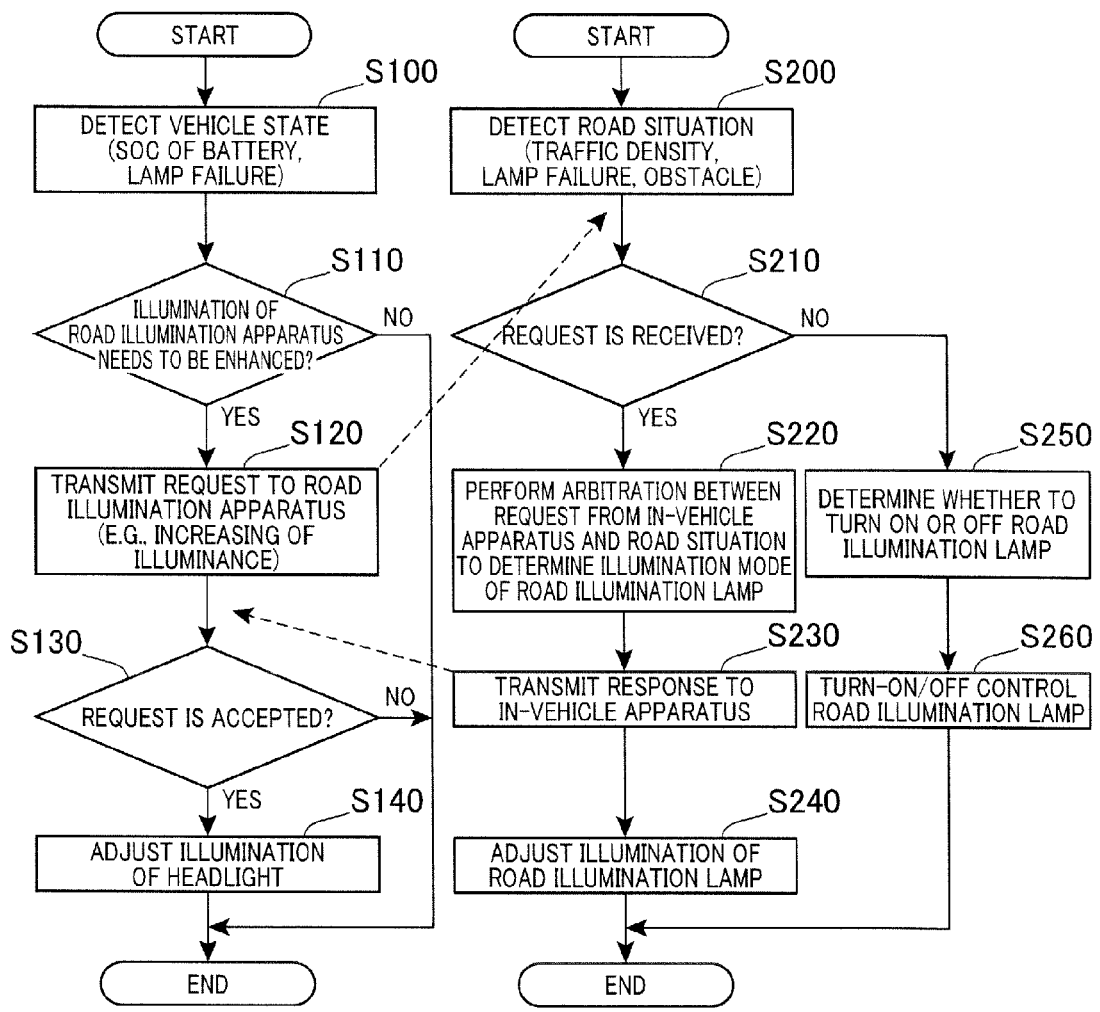
FIG. 2 shows a flowchart of a requesting process from an in-vehicle apparatus to a road illumination apparatus of the roadside-vehicle cooperative illumination system of FIG. 1.
Figure 3:
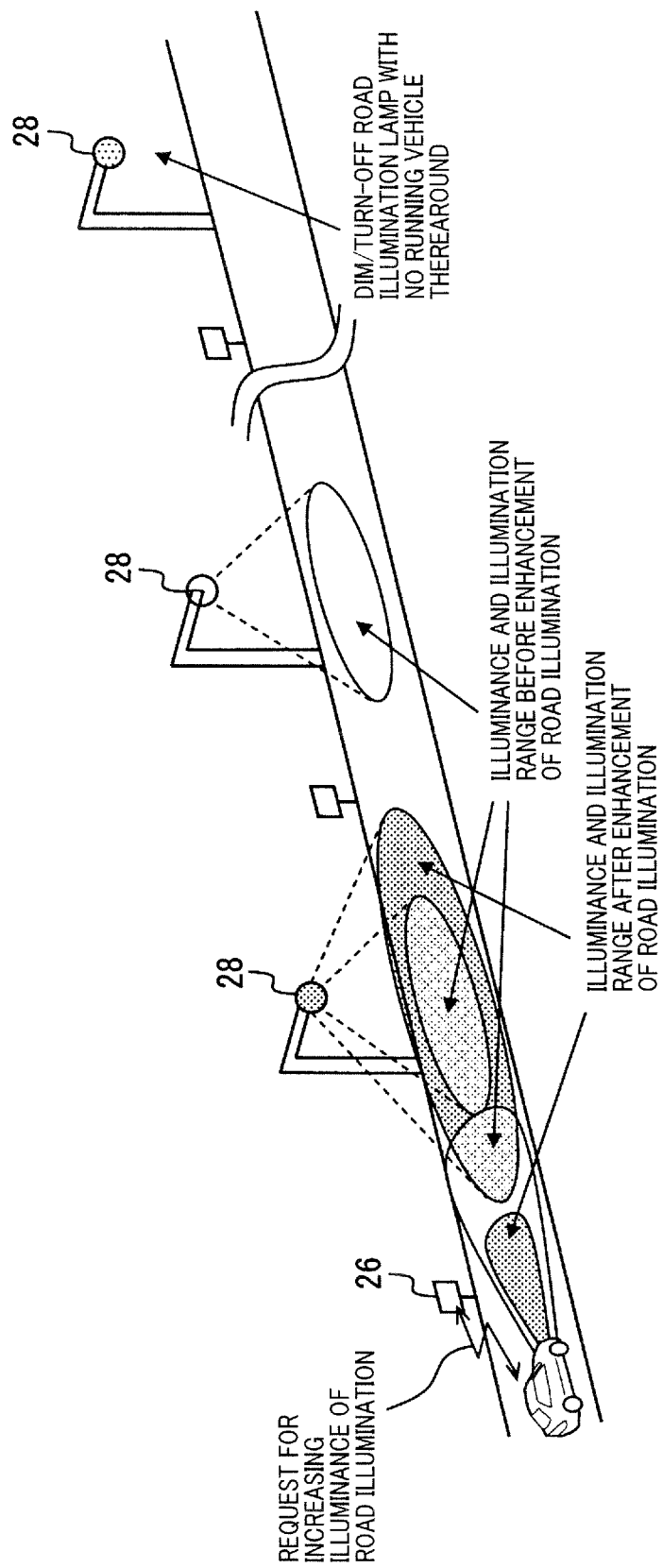
FIG. 3 shows a process of increasing at least one of an illuminance and a illumination range of a road illumination lamp while decreasing at least one of an illuminance and an illumination range of a headlight.

FIG. 2 shows a flowchart of a requesting process from the in-vehicle apparatus 10 to the road illumination apparatus 20 that includes a process (a sequence of operations) to be performed on the in-vehicle apparatus 10 side (steps S100 to S140) and a process (a sequence of operations) to be performed on the road illumination apparatus 20 side (steps S200 to S260).

The process of the in-vehicle apparatus 10 starts with turn-on of the headlight 17 by the driver of the motor-driven vehicle or fulfillment of a specific condition (for example, that the headlight of the vehicle including an auto light system is lighting, or that the vehicle has moved into a region under control of the roadside-vehicle cooperative illumination system). Once the process of the in-vehicle apparatus 10 is started, the in-vehicle apparatus 10 repeats the process as shown in the flowchart of FIG. 2 at a predetermined time interval.

In step S100, the SOC detector 11 detects the SOC of the battery and the headlight-state detector 12 detects an operating state of the headlight 17. In step S110, it is determined whether or not illumination needs to be enhanced by the road illumination apparatus 20, on the basis of a finding that the SOC of the battery detected by the SOC detector 11 has decreased equal to or lower than the predetermined value or that the headlight-state detector 12 has detected a failure in the headlight 17. If it is determined that the illumination needs to be enhanced through the road illumination apparatus 20, then the process on the in-vehicle apparatus 10 proceeds to step S120. Otherwise, the process on the in-vehicle apparatus 10 side ends.

In step S120, to enhance the illumination through the road illumination apparatus 20, the in-vehicle apparatus side arbiter 14 transmits to the road illumination apparatus 20 a request for increasing at least one of the illuminance and the illumination range of the road illumination lamp 28. Subsequently, in step S130, it is determined whether or not the request has been accepted by the road illumination apparatus 20, on the basis of a response to the request. If it is determined that the request has been accepted by the road illumination apparatus 20, then the process on the in-vehicle apparatus 10 side proceeds to step S140. If the request has been rejected by the road illumination apparatus 20, then the process on the in-vehicle apparatus 10 side ends. In cases where the in-vehicle apparatus 10 receives no response during a predetermined time period from the transmission of the request from the in-vehicle apparatus 10, then it may be considered that the road illumination apparatus 20 doesn't reside around the motor-driven vehicle, and then the process on the in-vehicle apparatus 10 side ends.

In step S140, the illuminance and the illumination range of the headlight 17 are adjusted. More specifically, when the remaining battery level (SOC) is decreased equal to or lower than the predetermined value, it is determined to decrease at least the illuminance of the headlight 17. This reads to reduction of battery power consumed by the headlight 17, and thus to minimum reduction of the continuously travelable distance.

On the road illumination apparatus 20 side, in step S200, the traffic density detector 21, the state-of-lamp detector 22, and the obstacle detector 23 detect a road situation. In step S210, it is determined whether or not the request from the in-vehicle apparatus 10 has been received. If the request from the in-vehicle apparatus 10 has been received, then the process proceeds to step S220. Otherwise, the process proceeds to step S250.

Subsequently, in step S220, arbitration between the request from the in-vehicle apparatus 10 and at least one of a required illumination range and an allowable illumination range for the own convenience of the road illumination apparatus 20 is performed to determine an illumination mode (illuminance, illumination range) of the road illumination apparatus 20. In step S230, a response indicative of whether or not to accept the request from the in-vehicle apparatus 10 is transmitted to the in-vehicle apparatus 10. In step S240, the illuminance and the illumination range of the road illumination lamp 28 are adjusted according to the determined illumination mode (illuminance, illumination range).

On the other hand, in step S250, it is determined according to the detected road situation whether to turn on or off the road illumination lamp 28, and in the case of determining to turn on the road illumination lamp 28, determine an illumination mode of the road illumination lamp 28. For example, as shown in FIG. 3, in the absence of a passing vehicle, it is determined to dim the road illumination lamp 28 (i.e., decrease the illuminance and/or the illumination range) or turn off the road illumination lamp 28 to thereby suppress wasted power consumption. Also in cases where the traffic density is equal to or larger than the predetermined value, it is determined to dim or turn off the road illumination lamp 28. This is because, in the presence of a number of vehicles passing through the illumination range of the road illumination lamp 28, the headlights of the passing vehicles can give rise to sufficient brightness by themselves.

Subsequently, in step S260, the road illumination lamp 28 is turn-on/off controlled according to the determination made in step S250.

According to the above control, when the power consumption of the headlight 17 has to be reduced or when it is not possible to ensure a sufficient illuminance of the headlight 17, the road illumination apparatus 20 is required to increase at least one of the illuminance and the illumination range of the road illumination lamp 28 to thereby enhance road illumination. When the road illumination apparatus 20 accepts the request from the in-vehicle apparatus 10, at least one of the illuminance and the illumination range of the road illumination lamp 28 is increased as shown in FIG. 3. This enables the road illumination lamp 28 to be controlled cooperatively with the headlight 17 so as to compensate for deficiencies in illuminance of the headlight 17, which leads to enhancement of vehicle driver's convenience and ensuring of safety.

The road illumination apparatus 20 transmits to the in-vehicle apparatus 10 via the roadside apparatus side communication unit 26 a response indicative of whether or not the request from the in-vehicle apparatus 10 has been accepted. The in-vehicle apparatus 10 determines at least one of the illuminance and the illumination range of the vehicle headlight 17 according to whether or not the request from the in-vehicle apparatus 10 has been accepted. This allows the illuminance and the illumination range of the vehicle headlight 17 to be decreased as shown in FIG. 3 in cases where the request from the in-vehicle apparatus 10 has been accepted by the road illumination apparatus 20. Therefore, for example, it may be allowed to increase the illuminance of the road illumination lamp while decreasing the illuminance of the vehicle headlight 17.

In the above, there has been explained with reference to the flowchart in FIG. 2 an exemplary process in which the in-vehicle apparatus 10 requests the road illumination apparatus 20 to increase at least one of the illuminance and the illumination range of the road illumination lamp 28 to thereby enhance road illumination of the road illumination apparatus 20.

Figure 4:
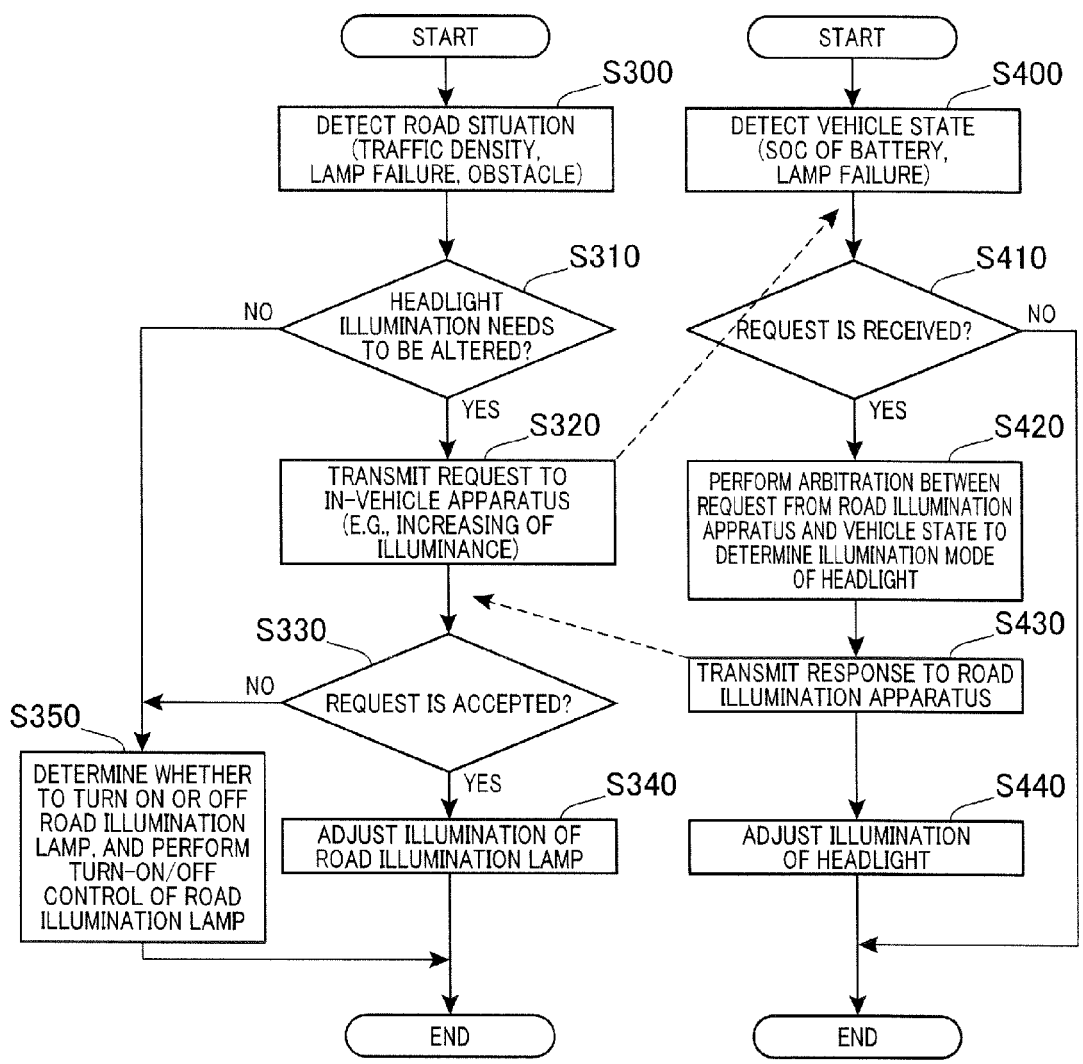
FIG. 4 shows a flowchart of a requesting process from a road illumination apparatus to an in-vehicle apparatus of the roadside-vehicle cooperative illumination system of FIG. 1.

There will now be explained with reference to a flowchart in FIG. 4 a reverse process in which the road illumination apparatus 20 requests the in-vehicle apparatus 10 to alter at least one of the illuminance and the illumination range of the headlight 17 to thereby alter the illumination mode of the headlight 17.

In step S300, the traffic density detector 21, the state-of-lamp detector 22, and the obstacle detector 23 of the road illumination apparatus 20 detect a road situation. Then in step S310, it is determined on the basis of the detected road situation whether or not it is necessary to request the in-vehicle apparatus 10 to alter at least one of the illuminance and the illumination range of the headlight 17.

As described above, in cases where there exists a failure in the road illumination lamp 28, in cases where there exist dwellings facing a road to be illuminated, in cases where a request for increasing at least one of the illuminance and the illumination range of the road illumination lamp 28 is transmitted from the in-vehicle apparatus 10 of at least one of a plurality of vehicles passing through the illumination range of the road illumination lamp 28 around the same time, and is accepted by the road illumination apparatus 20, or in cases where oncoming vehicles go by each other around an illumination spot of the road illumination lamp 28, it is necessary to request the in-vehicle apparatus 10 to alter at least one of the illuminance and the illumination range of the headlight 17.

If it is determined in step S310 that it is necessary to request the in-vehicle apparatus 10 to alter the illumination mode (i.e., at least one of the illuminance and the illumination range) of the headlight 17, then the process proceeds to step S320. Otherwise, the process proceeds to step S350.

In step S320, a request for increasing or decreasing at least one of the illuminance and the illumination range of the headlight 17 to thereby alter the illumination mode of the headlight 17 is transmitted to the in-vehicle apparatus 10. Subsequently, in step S330, it is determined on the basis of a response from the in-vehicle apparatus 10 whether or not the in-vehicle apparatus 10 has accepted the request. If the in-vehicle apparatus 10 has accepted the request, then the process proceeds to step S340. If the in-vehicle apparatus 10 has rejected the request, then the process proceeds to step S350.

In step S340, at least one of the illuminance and the illumination range of the road illumination lamp 28 is adjusted. More specifically, in cases where there exist dwellings facing a road, at least one of the illuminance and the illumination range of the road illumination lamp 28 is increased to thereby ensure a sufficient illuminance of the road illumination lamp 28. Also in cases where oncoming vehicles go by each other around an illumination spot of the road illumination lamp 28, at least one of the illuminance and the illumination range of the road illumination lamp 28 is increased. On the other hand, in cases where there exists a failure in the road illumination lamp 28, the illumination mode of the road illumination lamp 28 is adjusted to available illuminance and illumination range of the road illumination lamp 28.

Similarly to steps S250, S260, in step S350, since it is unnecessary to alter the illumination mode of the headlight 17 on the vehicle side, or since the request for altering the illumination mode of the headlight 17 cannot be accepted on the vehicle side, it is determined according to the detected road situation whether to turn on or off the road illumination lamp 28, and in the case of determining to turn on the road illumination lamp 28, an illumination mode of the road illumination lamp 28 is determined.

On the other hand, on the in-vehicle apparatus 10 side, the SOC detector 11 and the headlight-state detector 12 acquire information pertaining to an operating state of the headlight (SOC, lamp failure) in step S400. Then in step S410, it is determined whether or not the request from the road illumination apparatus 20 has been received. If the request from the road illumination apparatus 20 has been received, the process proceeds to step S420. Otherwise, the process ends.

In step S420, arbitration between the request from the road illumination apparatus 20 and at least one of a required illumination range and an allowable illumination range for the own convenience of the in-vehicle apparatus 10 is performed to determine an illumination mode (illuminance, illumination range) of the headlight 17. In step S430, a response indicative of whether or not to accept the request from the road illumination apparatus 20 is transmitted to the road illumination apparatus 20. Subsequently, in step S440, the illuminance and the illumination range of the headlight 17 are adjusted to the determined illumination mode (illuminance, illumination range).

This enables the headlight 17 of the vehicle and the road illumination lamp 28 to be controlled cooperatively according to various situations, for example, in cases where there exists a failure in the road illumination lamp 28, in cases where there exist dwellings facing a road to be illuminated, or in cases where oncoming vehicles go by each other around the road illumination lamp 28.

(Modifications)

For example, in cases where a plurality of road illumination apparatuses 20 (and thus their road illumination lamps 28) are positioned in series along a road, spaced apart from each other, preferably with a predetermined distance, turn-on/off and illumination modes when turned on of the road illumination lamps 28 may be controlled cooperatively, instead of illumination modes of the road illumination apparatuses being individually determined without mutual cooperation. This enables the sequence of road illumination lamps 28 to be turned on, for example, so that the road illumination lamps 28 cooperatively guide or lead a running vehicle by each road illumination lamp 28 illuminating the road during the running vehicle being in the illumination range of the road illumination lamp 28, which leads to safe and efficient road illumination with a reduced number of lighting road illumination lamps 28.

In the above embodiment with a sequence of road illumination apparatuses spaced apart from each other, information indicative of the leading illumination apparatus is transmitted to the in-vehicle apparatus 10 of the running vehicle via the roadside apparatus side communication unit 26 of the leading road illumination apparatus 20, and information indicative of the rear illumination apparatus is transmitted to the in-vehicle apparatus 10 of the running vehicle via the roadside apparatus side communication unit 26 of the rear road illumination apparatus 20, which enables the in-vehicle apparatus 10 to find a section along which the sequence of road illumination apparatuses 20 are installed, and thereby perform on-time adjustment of illumination of the headlight.

In addition, in the above embodiments, in cases where oncoming vehicles go by each other around an illumination spot of the road illumination lamp 28 of the road illumination apparatus 20, the road illumination apparatus 20 transmits to the in-vehicle apparatus 10 of each oncoming vehicle the request for decreasing at least one of the illuminance and the illumination range of the headlight of the oncoming vehicle. Additionally or alternatively, when the in-vehicle apparatus 10 of at least one of the oncoming vehicles detects the other oncoming vehicles on the basis of their lighting headlights, the in-vehicle apparatus 10 of the at least one oncoming vehicle may not only request the road illumination apparatus 20 to increase at least one of the illuminance and the illumination range of the road illumination lamp 28, but also decrease by itself at least one of the illuminance and the illumination range of the own headlight 17 when the own request is accepted by the road illumination apparatus 20. This also enables the headlight 17 and the road illumination lamp 28 to be controlled cooperatively so that a sufficient illuminance of the headlight can be ensured without dazzling the drivers of the other oncoming vehicles.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A roadside-vehicle cooperative illumination system comprising an in-vehicle apparatus mounted in a vehicle and responsible for controlling a headlight of the vehicle and a roadside apparatus positioned along a roadside and responsible for controlling a road illumination lamp, the headlight and the road illumination lamp being controlled cooperatively through communications between the in-vehicle apparatus and the roadside apparatus, wherein
   the in-vehicle apparatus comprises:
      a communication unit that communicates with the roadside apparatus;
      a detector that detects information pertaining to operation of the headlight of the vehicle; and
      an arbiter that transmits a request to the roadside apparatus for altering at least one of an illuminance and an illumination range of the road illumination lamp on the basis of the information pertaining to operation of the headlight of the vehicle detected by the detector; and
   the roadside apparatus comprises:
      a communication unit that communicates with the in-vehicle apparatus;
      an arbiter that determines whether or not to accept the request from the in-vehicle apparatus side arbiter, and determines at least one of the illuminance and the illumination range of the road illumination lamp on the basis of the determination of whether or not to accept the request from the in-vehicle apparatus side arbiter; and
      a controller that controls the road illumination lamp according to the at least one of the illuminance and the illumination range of the road illumination lamp determined by the roadside apparatus side arbiter.

2. The system of claim 1, wherein the in-vehicle apparatus further comprises a controller that controls the headlight of the vehicle according to at least one of an illuminance and an illumination range of the headlight of the vehicle determined by the in-vehicle apparatus side arbiter,
   the roadside apparatus side arbiter transmits a response indicative of the determination of whether or not to accept the request from the in-vehicle apparatus side arbiter, to the in-vehicle apparatus side arbiter via the roadside apparatus side communication unit,
   the in-vehicle apparatus side arbiter adjusts at least one of the illuminance and the illumination range of the headlight of the vehicle on the basis of the response from the roadside apparatus side arbiter, and
   the in-vehicle apparatus controller controls the headlight of the vehicle according to the at least one of the illuminance and the illumination range of the headlight of the vehicle adjusted by the in-vehicle apparatus side arbiter.

3. The system of claim 2, wherein the vehicle is a motor-driven vehicle and includes a battery that supplies electrical power to the motor and the headlight of the vehicle,
   the in-vehicle apparatus side detector detects a state-of-charge (SOC) of the battery, the detected SOC of the battery being included in the information pertaining to operation of the headlight of the vehicle, and
   the in-vehicle apparatus side arbiter transmits to the roadside apparatus a request for increasing at least one of the illuminance and the illumination range of the road illumination lamp when the SOC of the battery is decreased equal to or lower a predetermined value, and in cases where the request is accepted by the roadside apparatus, determines to decrease at least one of the illuminance and the illumination range of the headlight.

4. The system of claim 1, wherein the in-vehicle apparatus side detector detects whether or not there exists a failure in the headlight of the vehicle, the presence or absence of the failure being included in the information pertaining to operation of the headlight of the vehicle, and
   the in-vehicle apparatus side arbiter transmits to the roadside apparatus a request for increasing at least one of the illuminance and the illumination range of the road illumination lamp in the presence of the failure in the headlight of the vehicle.

5. The system of claim 1, wherein the roadside apparatus further comprises a detector that detects information pertaining to a road situation, and the roadside apparatus side arbiter transmits to the in-vehicle apparatus a request for altering at least one of an illuminance and an illumination range of the headlight of the vehicle on the basis of the information pertaining to the road situation detected by the roadside apparatus side detector.

6. The system of claim 5, wherein the roadside apparatus detector detects whether or not there exists a failure in the road illumination lamp, the presence or absence of the failure in the road illumination lamp being included in the information pertaining to the road situation, and the roadside apparatus side arbiter transmits to the in-vehicle apparatus a request for increasing at least one of the illuminance and the illumination range of the headlight of the vehicle in the presence of the failure in the road illumination lamp.

7. The system of claim 5, wherein the roadside apparatus detector detects a traffic density of a road to be illuminated by the road illumination lamp, the traffic density detected by the roadside apparatus detector being included in the information pertaining to the road situation and in cases where the traffic density detected by the roadside apparatus side detector is equal to or larger than a predetermined value, the roadside apparatus side arbiter determines to decrease at least one of the illuminance and the illumination range of the road illumination lamp, or turn off the road illumination lamp.

8. The system of claim 1, wherein when the roadside apparatus side arbiter receives a request for increasing at least one of the illuminance and the illumination range of the road illumination lamp transmitted from the in-vehicle apparatus of at least one of a plurality of vehicles passing through the illumination range of the road illumination lamp around the same time, and accepts the request from the at least one vehicle, the roadside apparatus side arbiter transmits to the in-vehicle apparatus of each of the other vehicles a request for decreasing at least one of the illuminance and the illumination range of the headlight of the other vehicle.

9. The system of claim 1, wherein when a plurality of oncoming vehicles go by each other around an illumination spot of the road illumination lamp, the roadside apparatus side arbiter transmits a request to the in-vehicle apparatus of each oncoming vehicle for decreasing at least one of the illuminance and the illumination range of the headlight of the oncoming vehicle, and determines to increase at least one of the illuminance and the illumination range of the road illumination lamp.

* * * * *